United States Patent
Muszinski

(10) Patent No.: US 11,912,557 B2
(45) Date of Patent: Feb. 27, 2024

(54) CONTAINER-HANDLING APPARATUS WITH A TRANSPORTATION ELEMENT

(71) Applicant: KHS GmbH, Dortmund (DE)

(72) Inventor: Olaf Muszinski, Kelkheim (DE)

(73) Assignee: KHS GmbH, Dortmund (DE)

( * ) Notice: Subject to any disclaimer, the term of this patent is extended or adjusted under 35 U.S.C. 154(b) by 362 days.

(21) Appl. No.: 17/424,915

(22) PCT Filed: Feb. 4, 2020

(86) PCT No.: PCT/EP2020/052664
§ 371 (c)(1),
(2) Date: Jul. 22, 2021

(87) PCT Pub. No.: WO2020/164953
PCT Pub. Date: Aug. 20, 2020

(65) Prior Publication Data
US 2022/0106179 A1   Apr. 7, 2022

(30) Foreign Application Priority Data
Feb. 15, 2019  (DE) .................... 10 2019 103 892.8

(51) Int. Cl.
*B67C 7/00* (2006.01)
*B65G 47/84* (2006.01)

(52) U.S. Cl.
CPC .......... *B67C 7/0046* (2013.01); *B65G 47/846* (2013.01); *B65G 2201/0244* (2013.01); *B67C 2007/006* (2013.01)

(58) Field of Classification Search
None
See application file for complete search history.

(56) References Cited

U.S. PATENT DOCUMENTS

| 5,029,695 A | * | 7/1991 | Kovara | B67C 7/004 198/803.11 |
| 5,341,620 A | | 8/1994 | Katou et al. | |
| 11,084,700 B2 | * | 8/2021 | Dreger | B65G 47/847 |

FOREIGN PATENT DOCUMENTS

| CN | 105383042 A | 3/2016 |
| CN | 107207104 A | 9/2017 |

(Continued)

OTHER PUBLICATIONS

International Search Report, PCT Application No. PCT/EP2020/052664, dated May 19, 2020 (6 pages).

*Primary Examiner* — Kavel Singh
(74) *Attorney, Agent, or Firm* — Occhiuti & Rohlicek LLP

(57) ABSTRACT

A container-handling machine that comprises a rotor that rotates around a machine axis, an inlet transporter that brings containers to the rotor, an outlet transporter that takes containers from the rotor, and a container-handling section that extends along a handling direction along which the containers move after having been taken from the rotor, wherein the rotor comprises handling positions and a transport element, wherein the transport element comprises pockets along a circumference thereof, wherein each of the pockets comprises a flank that forms a first abutment surface that abuts a container during motion thereof, wherein the container-handling machine further comprises a finger that is assigned to the pocket, and wherein the finger forms a second abutment surface that adjoins the first abutment surface and that extends in a radial direction away from the machine axis.

17 Claims, 4 Drawing Sheets

(56) References Cited

FOREIGN PATENT DOCUMENTS

| | | |
|---|---|---|
| DE | 4236784 A1 | 5/1993 |
| DE | 102009017109 A1 | 10/2010 |
| DE | 102012217457 A1 | 5/2014 |
| EP | 2987764 A1 | 2/2016 |
| EP | 3246258 A1 | 11/2017 |
| WO | 2010118806 A2 | 10/2010 |

* cited by examiner

CONTAINER-HANDLING APPARATUS WITH A TRANSPORTATION ELEMENT

RELATED APPLICATIONS

This is the national stage of international application PCT/EP2020/052664, filed on Feb. 4, 2020, which claims the benefit of the Feb. 15, 2019 priority date of German application DE 102019103892.8, the contents of which are incorporated herein by reference.

FIELD OF INVENTION

The invention relates to a container-handling apparatus, in particular a filling machine for filling cans or similar containers with liquid content.

BACKGROUND

In a filling machine, it is usual for a container to be transported from one rotating element to another. Among these rotating elements are transport stars that hold container on peripheries thereof.

In the course of being transported, a container is apt to undergo multiple accelerations. These accelerations result in forces. If the container has been filled but not yet closed, it is possible for some of the liquid content to spill out.

To avoid losing liquid content, it is known to reduce the speeds at which the container travels. However, this reduces throughput.

SUMMARY

An object of the invention is that of reducing the extent to which a change in acceleration, i.e., a jerk, causes liquid to spill out of a filled container as the container makes its way to a closing machine.

According to one major aspect, the invention relates to a container-handling apparatus, in particular to a filling machine for the filling of cans or similar containers with a liquid filling material along a container handling section running in a handling direction. In this situation, the container-handling apparatus comprises a first transporter, configured as a container inlet, a rotor downstream in the handling direction and rotating about a machine axis, and a second transporter, likewise downstream of the rotor in the handling direction and configured as a container outlet.

In this situation, several handling positions are arranged at the circulating rotor, as well as a transport element that moves together with this rotor in the same direction in synchrony around the machine axis, and that comprises several transport pockets distributed over the circumference about the machine axis. The circulating rotor and the jointly circulating transport element can also be configured as one piece or as a common structural module.

The transport pockets further comprise in each case at least one front flank, moving in the front in relation to a circulating direction of the transport element, and at least one rear flank, following on in relation to the circulating direction, of which at least the rear flank forms in at least one part region a first abutment surface for the tight-contact transport of the containers.

According to the invention, provision is made in this situation for a transport finger to be assigned to each rear flank of the corresponding transport pocket, which comprises a second abutment surface, by means of which the first abutment surface formed at the rear flank is extended in curved form in a direction that is oriented away from the machine axis in the radial direction.

Within the framework of the present invention, the expression "direction oriented away in the radial direction" is understood to be moving away from the machine axis radially outwards.

In some embodiments, the second abutment surface connects immediately adjacent to the first abutment surface, in a direction oriented away from the machine axis.

In some embodiments, the second abutment surface at the transport finger is configured such that, when the container is transferred onwards from the rotor onto the second transporter following downstream in the handling direction, after leaving a start point of the thrust movement out of the transport pocket of the rotor or transport element respectively, the radial speed and/or tangential speed of the container during the camber change of the movement path of this container is increased and/or decreased in comparison to its circumferential speed during transport before reaching the start point of the thrust movement in such a way that the centripetal acceleration taking effect on the container is overall reduced and/or continuously changed, i.e. as far as possible jerk-free.

In some embodiments, the second abutment surface of a corresponding transport finger in a first abutment surface section to connect, in the radial direction to the machine axis, to the first abutment surface, and specifically preferably in such a way that the respective transfer between the first and second abutment surfaces is configured so as to be smooth.

In some embodiments, the respective transport finger is arranged at the circumference of the transport element.

In some embodiments, the second abutment surface comprises, in a direction oriented away from the machine axis, a second abutment surface section, connecting adjacent to the first abutment surface section, which then forms a concave-configured acceleration section or a convex-configured braking section.

In some embodiments, the second abutment surface section connects immediately adjacent to the first abutment surface in a direction oriented away from the machine axis.

In some embodiments, the second abutment surface, in the second abutment surface section connecting to the first abutment surface section oriented in the radial direction away from the machine axis, is cambered initially concave and then convex, such that an acceleration section and then a braking section are formed in the second abutment surface second.

In some embodiments, concave, convex, and linear surface sections are advantageously combined with one another in such a way that the slopping behavior of the filling material is positively influenced, which signifies that the height of the slopping movements of the filling material is reduced.

In some embodiments, the second abutment surface section is configured as a clothoid, or trigonometric function, or polynomial of higher degree, in particular of the second degree or higher.

In some embodiments, the second abutment surface comprises a third abutment surface section connecting to the second abutment surface section in a direction oriented away from the machine axis, which preferably connects immediately adjacent to the second abutment surface section and exhibits the same radial orientation as the first abutment surface section.

In some embodiments, the second abutment surface comprises a fourth abutment surface section connecting to the third abutment surface section in a direction oriented away from the machine axis, which preferably connects immediately adjacent as well as convex to the third abutment surface section.

In some embodiments, the second transport element for transferring the containers, after leaving the engagement by the transport fingers of the transport element, comprises at least one railing guide, along which the containers are guided in the handling direction, being guided laterally on at least one of their sides.

In some embodiments, the second transporter comprises transport fingers that move with it, wherein the corresponding containers are accelerated or braked, by means of an abutment surface of the transport fingers provided at the transport element, to a speed that corresponds to the speed of the transport fingers of the second transporter, such that a jerk-free transfer takes place between the rotor and the second transporter.

Embodiments include those in which the container-handling apparatus is be configured as a filling machine and those in which it is configured as a closing device.

In another aspect, the invention features a container-handling machine that comprises a rotor that rotates around a machine axis, an inlet transporter that brings containers to said rotor, an outlet transporter that takes containers from said rotor, and a container-handling section that extends along a handling direction along which said containers move after having been taken from said rotor, wherein said rotor comprises handling positions and a transport element, wherein said transport element comprises pockets along a circumference thereof, wherein each of said pockets comprises a flank that forms a first abutment surface that abuts a container during motion thereof, wherein said container-handling machine further comprises a finger that is assigned to said pocket, and wherein said finger forms a second abutment surface that adjoins said first abutment surface and that extends in a radial direction away from said machine axis.

The term "clothoid" refers to a curve, of which the camber constantly increases or decreases in a linear manner so that the product from curve radius and arc length of the curve forms a constant. In other words, the camber at each point of the curve is proportional to the length of its arc up to this point.

The term "container" means any type of container, in particular bottles, cans, beakers etc., in each case of metal, glass, and/or plastic, preferably of PET (polyethylene terephthalate).

The expression "essentially" or "approximately" signifies in the meaning of the invention deviations from the exact value in each case by +/−10%, preferably by +/−5% and/or deviations in the form of changes that are not of significance to the function.

Further embodiments, advantages, and possible applications are also derived from the following description of exemplary embodiments and from the Figures. In this situation, all the features described and/or represented in figures are in principle the object of the invention, individually or in any desired combination, regardless of their summary in the claims or reference to them. The contents of the claims are also deemed to be a constituent part of the description.

These and other features of the invention will be apparent from the following detailed description and the accompanying figures, in which:

BRIEF DESCRIPTION OF THE FIGURES

In the figures, identical reference numbers are used for those components that are the same or have the same effect. Only those reference numbers that are useful for understanding a particular figure are included in that figure.

DETAILED DESCRIPTION

Figure 1:
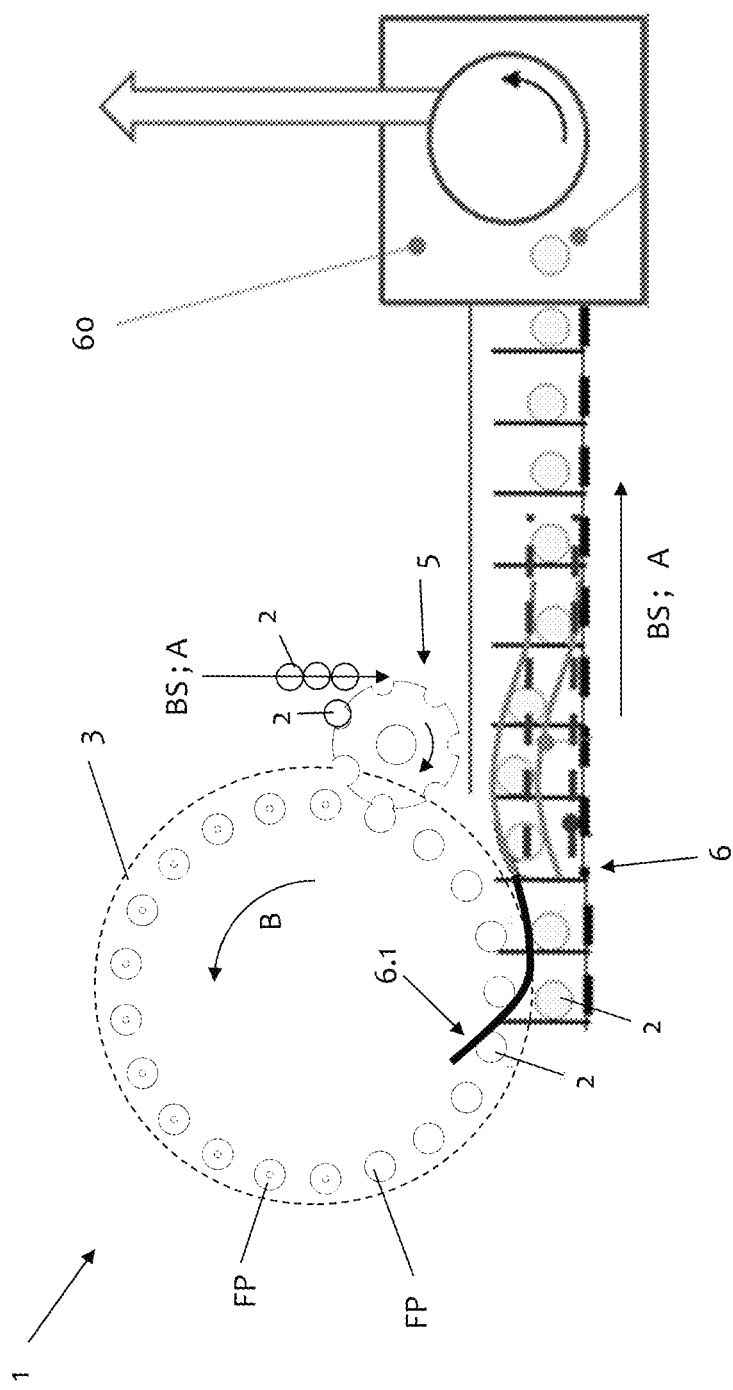
FIG. 1 shows a view from above a filling machine that fills containers with liquid.

FIG. 1 shows a container-handling machine 1 for pressure filling containers 2 with liquid, such as beer or a soft drink. The container 2 moves along a handling section BS that runs in a handling direction A. The filling machine 1 includes a rotor 3 that rotates about a vertical machine axis MA in a rotation direction B. Along its circumference, the rotor 3 has multiple filling positions FP.

An inlet transporter 5 delivers containers to a container inlet and an outlet transporter 6 receives filled containers at a container outlet. In the illustrated embodiment, the inlet transporter 5 comprises an inlet star and the outlet transporter 6 is a linear conveyor that conveys cans 2 towards a closing machine 60 along the handling section BS. These container 2 have been filled but not yet closed. Accordingly, the liquid in a container 2 is vulnerable to being spilled as a result of the can's movement.

Figure 2:
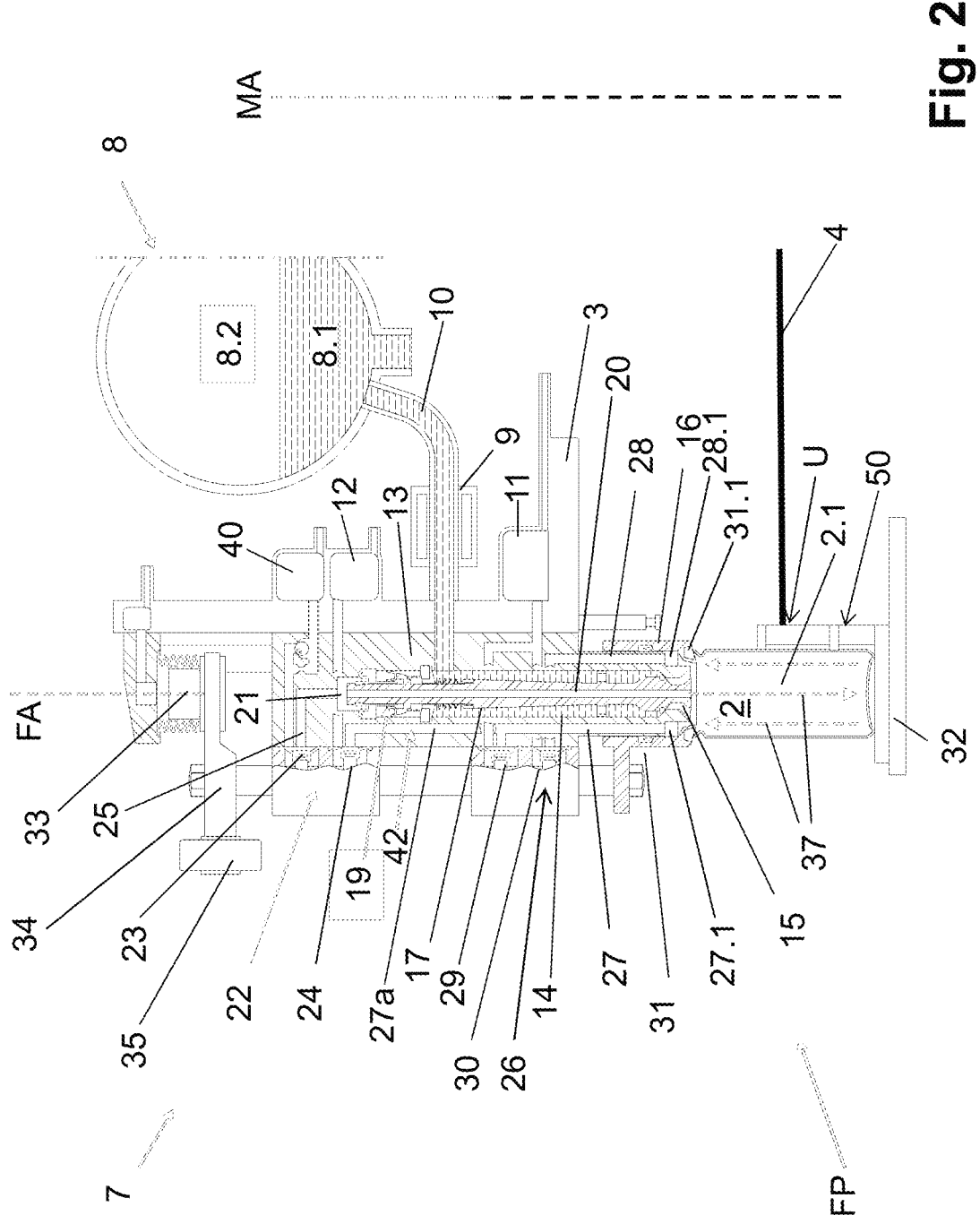
FIG. 2 shows a filling position from the filling machine of FIG. 1.

Referring now to FIG. 2, a container 2 is filled at a filling element 7 as it travels between the inlet transporter 5 and the outlet transporter 6. During the filling process, the container 2 is arranged with its axis parallel to the machine axis MA and coaxial with a filling-position axis FA of the filling position FP that it occupies.

The container 2 can also be filled in a linear filling machine instead of a rotating filling machine as disclosed herein. A variety of containers 2 can be filled in the illustrated manner, including cans and large PET containers, such as kegs, that are commonly used for beer.

Accordingly, the subject matter disclosed and claimed herein is not restricted to that shown. For example, in some embodiments, the container-handling machine 1 comprises a closing device such as that shown in DE 10 2009 017 109. Such a closing device features a holding plate that is similar in technical effect to the rotor 3. In this context, container-handling positions FP would be configured as closing positions instead of filling positions.

As shown in FIG. 2, the rotor 3 includes a tank 8 having a liquid space 8.1 and a gas space 8.2. The liquid space 8.1 is filled with liquid that is to be for filling the containers 2. The gas space 8.2, which lies above the liquid space 8.1, is pressurized with an inert gas, such as carbon dioxide or nitrogen to a filling pressure. In a typical embodiment, the filling pressure is between three atmospheres and five atmospheres. This tank 8 is common to all of the filling positions FP. In a preferred embodiment, the tank 8 is a ring tank.

The rotor 3 also includes first, second, and third ring-channels 11, 12, 40 that surround the machine axis MA and that are common to all the handling positions FP or filling elements 7.

The first ring-channel 11 returns gas that has been used to flush out a container 2 or relieve pressure in a container 2 at a filling element 7. The pressure in the first ring-channel 11 is either atmospheric pressure or slightly below atmospheric pressure.

The second ring-channel 12 serves as a return gas collection channel in which the flushing and/or pressure relief gas used during the flushing and/or pressure relief phase is at least partially drawn off so that it can be reused for flushing the container's interior 2.1. Within the second ring-channel 12, there is a slight overpressure that corresponds to a flushing or relief pressure of between 0.2 and 0.5 atmospheres.

The third ring-channel 40 conveys the pressurized inert gas. The pressure within the third ring-channel 40 is about the same as or slightly less than the filling pressure that prevails in the gas space 8.2.

A housing 13 houses filling element 7. A liquid channel 14 extends through this housing 13. At its upper region, the liquid channel 14 connects to a product line 10. The filling element's underside forms a ring-shaped discharge opening 15 that is concentric with and that surrounds the filling-element axis FA. This opening 15 discharges liquid into a container 2 during filling thereof.

A liquid valve 16 in the liquid channel 14 upstream of the discharge opening 15 controls flow through the opening 15. The liquid valve 16 includes a valve body 18 that is arranged at a valve tappet 17 that is coaxial with the filling-element axis FA.

In FIG. 2, the liquid valve 16 the valve body 18 contacts a valve surface, thus forming a seal. The liquid valve 16 is thus closed. Raising the valve body 18 opens the liquid valve 16. To open the liquid valve 16, a pneumatic actuator 19 moves the valve tappet 17.

The valve tappet 17 defines a gas channel 20 that is likewise concentric with the filling-element axis FA. This gas channel 20 extends from the discharge opening 15 to an upper end of the valve tappet 17, where it opens into a gas space 21 in the filling element housing 13.

First, second, and third gas paths 26, 42, 22 formed in the housing 13 are used to control different phases of the filling process during the pressure filling of the respective containers 2. The first, second, and third gas-paths 26, 42, 22 are thus controlled gas-paths.

The first gas path 26 has two return gas openings 27.1, 28.1 that selectively connect to the first ring-channel 11. These return gas openings 27.1, 28.1 are on the underside of the filling element 7 on opposite sides of the discharge opening 15 so that they are radially offset from the filling-element axis FA and slightly above the discharge opening 15 along the direction of the filling-element axis FA. In the illustrated embodiments, the return gas openings 27.1, 28.1 are diametrically opposite each other and thus separated by 180°.

The return-gas openings 27.1, 28.1 form lower openings or sections of first and second return-gas channels 27, 28. The first and second return-gas channels 27, 28 extend upward from their corresponding return-gas openings 27.1, 28.1 in a direction that is parallel to that of the filling-element axis FA. The first and second return-gas channels 27, 28 form part of the first gas path 26. Each of the first and second return-gas channels 27, 28 has a corresponding control valve 29, 30 respectively. These control valves 29, 30 are pneumatically actuatable valves. The inlets of the control valves 29, 30 connect to the first and second return-gas channels 27, 28 respectively. The outlets of both control valves 29, 30 are connected to the first ring-channel 11.

The second gas-path 42 provides a connection between the return-gas opening 27.1 and the second ring-channel 12. From the return gas-opening 27.1 onwards, the second gas-path 42 makes use of the gas channel 27 of the first gas-path 26. This gas channel 27 branches off into a gas channel 27a upstream of control valve 29 that is in fluid connection with the gas channel 27. A pneumatically actuated control valve 24 controls the second gas-path 42. The inlet of the control valve 24 is in fluid communication with both the gas channel 27a. The outlet of the control valve 24 is in fluid communication with the second ring-channel 12.

The third gas-path 22 provides a controllable connection between the gas space 21 and the third ring-channel 40. A pneumatically-actuated control valve 23 along the third gas-path 22 provides a connection between the third ring channel 40 and the gas space 21 via a gas channel 25.

During flushing, pre-stressing, and filling, a ring seal 31.1 of a centering bell 31 seals against the container's opening as the container 2 stands upright on a container carrier 32. This forms a sealed space that is in fluid communication with the lower end of the gas channel 20 and the return gas-openings 27.1, 28.1.

A pneumatic actuator 33, such as a folding bellows subjected to the filling pressure, provides tension to hold the lowered centering bell 31 in place. A rod 34 provides communicates this tension to the centering bell 31. A roller 45 coupled to the rod 34 moves up and down as it travels along a control curve that is stationary relative to the rotor 3. This raises and lowers the bell 31 so that the container 2 can be inserted into and removed from the filling position FP.

FIG. 2 also shows a transport element 4 under the rotor 3 that moves with the rotor 3 around the machine axis MA. The transport element 4 is preferably a circular disk or portion thereof.

Figure 3:
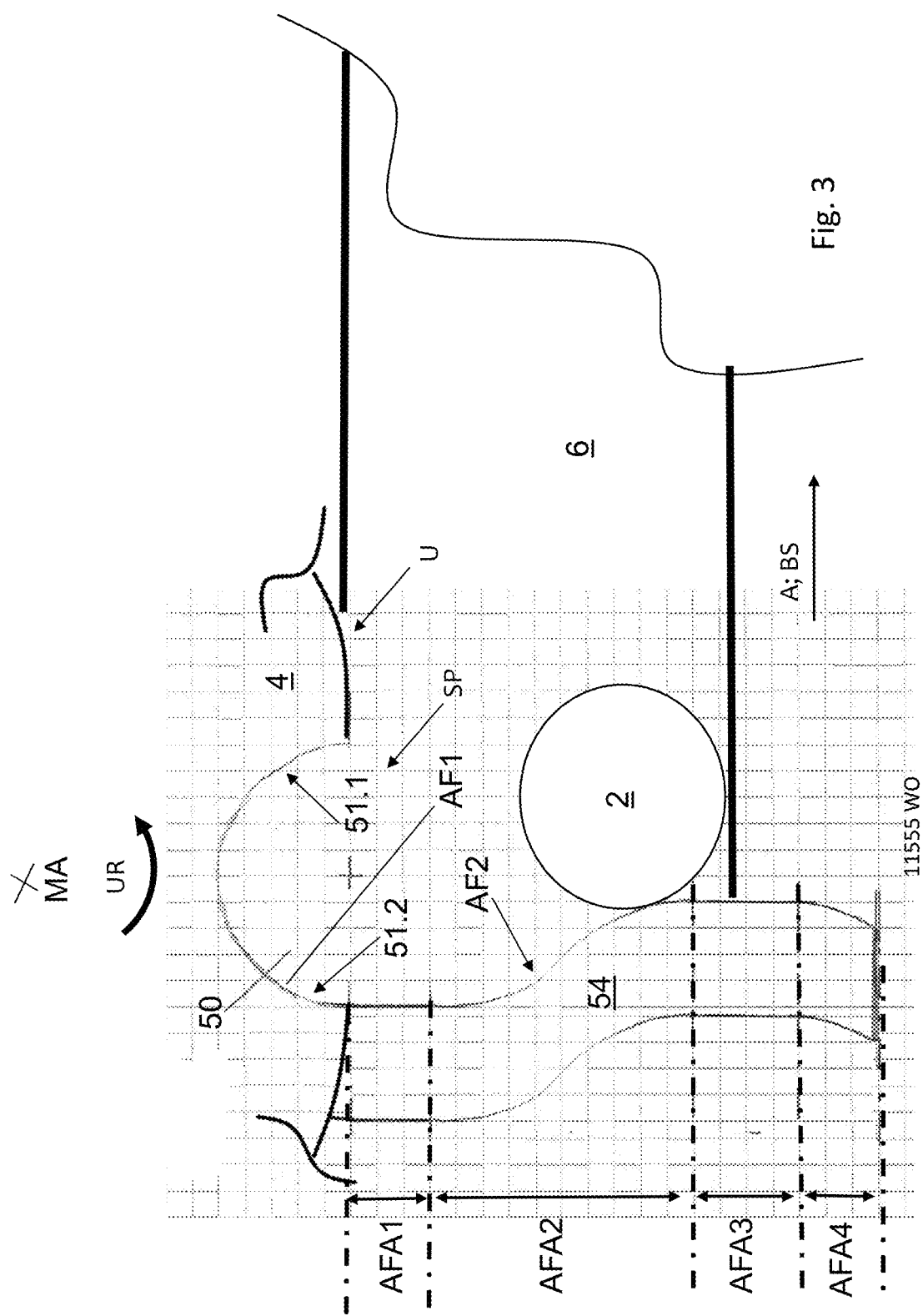
FIG. 3 shows a view from above a transport element showing a transport finger.

Referring now to FIG. 3, a pocket 50 holds the container 2 as it is being handed over to the outlet transporter 6. At a starting point SP, the container 2 is thrust out of the pocket 50 towards the outlet transporter 6. The outlet transporter 6 receives the container 2 for transport to the closing machine 60. In some embodiments, the closing machine 60 is configured as part of an overall filling system that includes the filling machine 1. In the course of being thrust from the pocket 50, the container's path changes. As a result, a force due to centripetal acceleration arises.

A transport pocket 50 moves the container 2 in a motion direction UR. The transport pocket 50 has a front flank 51.1 and a rear flank 51.2. Referring back to FIG. 1, a guide rail 6.1 opposite the pocket 50 guides the container 2 by engaging that portion of its outer casing that faces away from the pocket 50. In some embodiments, this guide rail 6.1 includes a section that follows a clothoid, a trigonometric function, or a polynomial of order two or greater.

During transfer of a container 2, the container 2 moves along first and second abutment surfaces AF1, AF2. The rear flank 51.2 forms the first abutment-surface AF1. A transport finger 54, which is associated with the rear flank 51.2, forms the second abutment-surface AF2. The transport finger 54 that is arranged on a circumference U of the transport element 4.

This first abutment-surface AF1 thrusts the container 2 along the motion direction UR. In a preferred embodiment, the rear flank 51.2 forms a circular arc that matches the shape of the container 2.

The second abutment surface AF2 connects to the first abutment surface AF1 and extends away from the machine axis MA. As a result, the second abutment surface AF2 extends the first abutment surface AF1 so that the combined abutment surfaces AF1, AF2 form a smooth curve. As the container 2 follows the curve formed by the second abutment surface AF2, the magnitude of its velocity vector decreases, either as a result of decreasing its radial velocity, circumferential velocity, or both, thereby decreasing the centripetal acceleration experienced by the container 2.

The second abutment surface AF2 includes a first section AFA1 and optional second, third, and fourth sections AFA2, AFA3, AFA4.

The first section AFA1 adjoins the first abutment surface AF1 and forms a continuous curve with no inflection point, thus ensuring smooth transfer of a container 2 between the first and second abutment surfaces AF1, AF2.

The second section AFA2 is a concave section that causes positive or negative acceleration of the container 2 depending on whether the spaces between closing positions in the closing device 50 are larger or smaller than those spacings between the filling positions FP. The extent of the acceleration is selected based on the container's shape and the liquid's properties, and in particular, its viscosity. In particular, a liquid with high viscosity will be able to sustain greater acceleration without spilling than a liquid with low viscosity. This is particularly advantageous when the container-handling machine 1 forms a block system, in which the filling machine and the closing device 60 are configured as one structural unit, i.e. the two parts of the system follow one another directly and in which containers 2 are transferred between these two parts in a forcibly guided manner.

Figure 4:
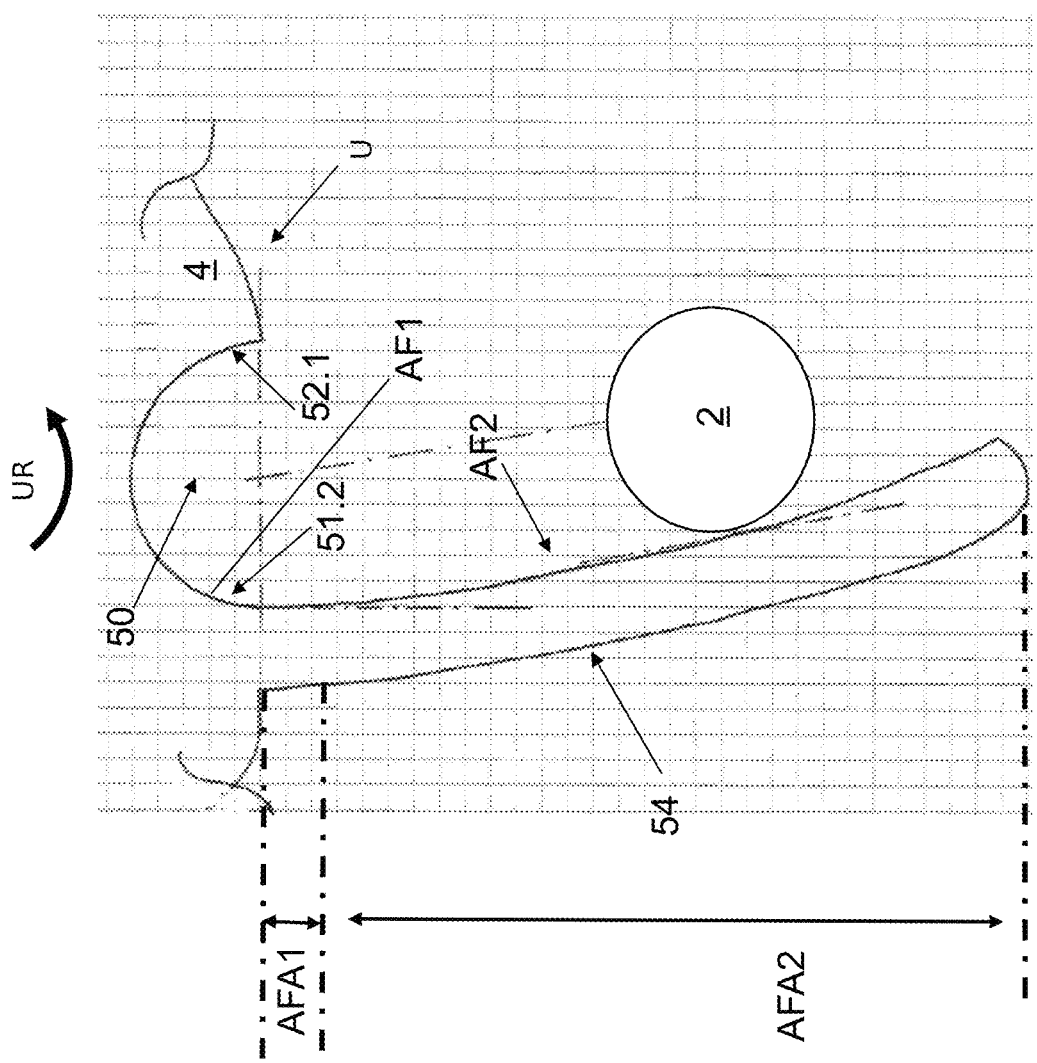
FIG. 4 shows an alternative transport finger.

For those cases in which acceleration is to be positive, the second section AFA2 is concave, as shown in FIG. 4. This is the case in particular if the spacing between closing positions at the closing device 60 is greater than the spacing between filling positions FP at the rotor 3.

For those cases in which the acceleration is to be negative, the second section AFA2 is convex and thus functions as a braking section. This is useful when the spacing between closing positions at the closing device 60 is less than the spacing between filling positions FP at the rotor 3. In some embodiments, the second section AFA2 has an inflection point such that it is initially concave and then convex after the inflection point. This results in an acceleration that is initially positive and then changes sign to become negative, as shown in FIG. 3. Preferably, the second section AFA2 is configured as either a clothoid, a trigonometric function, or a polynomial of order two or greater.

In some embodiments, a third section AFA3 adjacent to the second section AFA2 extends radially away from the machine axis MA. The third section AFA3 has the same radial orientation as that of the first section AFA1, as shown in FIG. 3.

Among the foregoing embodiments are those in which a fourth section AFA4, which also extends away from the machine axis MA, connects to the third section AFA3 to add a convex section.

Also among the foregoing embodiments are those in which a fourth section AFA4, which also extends away from the machine axis MA, connects to the third section AFA3 to add a concave section.

The second transporter 6 features an endlessly circulating transport band to convey the containers 2 after they leave the start point SP. A suitable band is a fly-top chain. Once the container 2 leaves the transport finger 45, the guide rail 6.1 guides the container 2.

Some embodiments omit the guide rail 6.1. In such embodiments, the transport fingers 54 rotate with the transporter and the cans 2 are accelerated, positively or negatively, to a velocity that matches that of the second transporter 6. This promotes a jerk-free transfer between the rotor 3 and the second transporter 6.

The foregoing description assumes that the pocket 50 thrusts the container. However, in other embodiments, the pocket 50 holds the container back. As a result, the container 2 is instead in contact with the first flank 51.1. In such cases, the transport finger 54 is arranged to extend the curve formed by the first flank 51.1. This configuration arises when the container 2 is pushed, while still in the pocket 50, onto a linear conveyor that is moving faster than the transport element's circumferential velocity. Such an arrangement results in the mirror image of FIGS. 3 and 4.

The foregoing description is not limited to a filling machine since the principles being applied do not depend on what type of machine is being used. Thus, the same principles are applicable to the case of a closing machine.

The invention claimed is:

1. An apparatus comprising a container-handling machine that comprises a rotor that rotates around a machine axis, an inlet transporter that brings containers to said rotor, an outlet transporter that takes containers from said rotor, and a container-handling section that extends along a handling direction along which said containers move after having been taken from said rotor, wherein said rotor comprises handling positions and a transport element, wherein said transport element comprises pockets along a circumference thereof, wherein each of said pockets comprises a flank that forms a first abutment surface that abuts a container during motion thereof, wherein said container-handling machine further comprises a finger that is assigned to said pocket, and wherein said finger forms a second abutment surface that adjoins said first abutment surface and that extends in a radial direction away from said machine axis, said second abutment surface comprising a first section and a second section, the second section being either concave or convex and extending away from said machine axis.

2. The apparatus of claim 1, wherein said second abutment surface is connected so as to be directly adjacent to said first abutment surface and to extend in a direction radially away from said machine axis.

3. The apparatus of claim 1, wherein said container has a velocity, wherein said second abutment surface is shaped such said container, after leaving said pocket and while contacting said second abutment surface, said container's velocity is changed such that said container sustains a reduced centripetal acceleration relative to that sustained by said container while said container was moving with said pocket.

4. The apparatus of claim 1, wherein said second abutment surface comprises a first section that connects to said first abutment surface to form a smooth curve with no inflection point.

5. The apparatus of claim 1, wherein said finger is arranged to extend from a circumference of said transport element.

6. The apparatus of claim 1, wherein said second section is concave.

7. The apparatus of claim 1, wherein said second section is convex.

8. The apparatus of claim 1, wherein said second abutment surface comprises a first section and a second section, wherein said second section is directly adjacent to said first section so as to form a continuous curve along said first and second sections.

9. The apparatus of claim 1, wherein said wherein said second abutment surface comprises a first section and a second section, wherein said first section is concave and said second section is convex, whereby said second abutment surface imparts an acceleration that changes sign as said container moves between said first section and said second section.

10. The apparatus of claim 9, wherein said second section is distal to said first section and said second section is configured as a clothoid.

11. The apparatus of claim 1, wherein said second abutment surface comprises first, second, and third sections that extend away from said machine axis, wherein said second section connects said first and third sections and is adjacent to said first and third sections, wherein said first, second, and third sections are curved such that acceleration of said container changes sign in crossing between said first and second sections and changes sign again in crossing between said second and third sections.

12. The apparatus of claim 1, wherein said transport element comprises said transport finger, wherein said container-handling machine comprises a guide rail that guides said container as said container disengages from said transport finger, and wherein said guide rail guides said container along said handling direction by abutting a side of said container to constrain said container from moving laterally and away from said handling direction.

13. The apparatus of claim 1, wherein said outlet transporter comprises further transport fingers that move together in a lateral direction, wherein said second abutment surface causes a change in sign of an acceleration of said container to achieve a velocity that matches that of said transport fingers of said outlet transporter, thereby promoting jerk-free transfer of said container between said rotor and said outlet transporter.

14. The apparatus of claim 1, wherein said container-handling machine comprises a filling machine.

15. The apparatus of claim 1, wherein said container-handling machine comprises a closing machine.

16. An apparatus comprising a container-handling machine that comprises a rotor that rotates around a machine axis, an inlet transporter that brings containers to said rotor, an outlet transporter that takes containers from said rotor, and a container-handling section that extends along a handling direction along which said containers move after having been taken from said rotor, wherein said rotor comprises handling positions and a transport element, wherein said transport element comprises pockets along a circumference thereof, wherein each of said pockets comprises a flank that forms a first abutment surface that abuts a container during motion thereof, wherein said container-handling machine further comprises a finger that is assigned to said pocket, and wherein said finger forms a second abutment surface that adjoins said first abutment surface and that extends in a radial direction away from said machine axis, wherein said wherein said second abutment surface comprises a first section and a second section, wherein said first section is concave and said second section is convex, whereby said second abutment surface imparts an acceleration that changes sign as said container moves between said first section and said second section, and wherein said second section is distal to said first section and said second section is configured as a polynomial of order greater than or equal to two.

17. An apparatus comprising a container-handling machine that comprises a rotor that rotates around a machine axis, an inlet transporter that brings containers to said rotor, an outlet transporter that takes containers from said rotor, and a container-handling section that extends along a handling direction along which said containers move after having been taken from said rotor, wherein said rotor comprises handling positions and a transport element, wherein said transport element comprises pockets along a circumference thereof, wherein each of said pockets comprises a flank that forms a first abutment surface that abuts a container during motion thereof, wherein said container-handling machine further comprises a finger that is assigned to said pocket, wherein said finger forms a second abutment surface that adjoins said first abutment surface and that extends in a radial direction away from said machine axis, and wherein said second abutment surface comprises first, second, third, and fourth sections that extend away from said machine axis, wherein said second section is between said first and third sections, wherein said third section is between said second section and said fourth section, and wherein said sections are curved such that acceleration of said container changes sign when crossing between any two adjacent sections.

* * * * *